(12) United States Patent
Tanoue

(10) Patent No.: US 11,335,929 B2
(45) Date of Patent: May 17, 2022

(54) FUEL CELL SYSTEM

(71) Applicant: TOYOTA JIDOSHA KABUSHIKI KAISHA, Toyota (JP)

(72) Inventor: Hidetaka Tanoue, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/257,532

(22) Filed: Jan. 25, 2019

(65) Prior Publication Data

US 2019/0237785 A1    Aug. 1, 2019

(30) Foreign Application Priority Data

Jan. 30, 2018  (JP) .............................. JP2018-014101

(51) Int. Cl.
*H01M 8/04746* (2016.01)
*H01M 8/0438* (2016.01)
*H01M 8/04089* (2016.01)

(52) U.S. Cl.
CPC ... *H01M 8/04776* (2013.01); *H01M 8/04432* (2013.01); *H01M 8/04089* (2013.01)

(58) Field of Classification Search
None
See application file for complete search history.

(56) References Cited

U.S. PATENT DOCUMENTS

| 2010/0159342 A1* | 6/2010 | Imanishi | H01M 8/04365 |
| | | | 429/444 |
| 2012/0189935 A1* | 7/2012 | Kato | H01M 8/04388 |
| | | | 429/446 |

FOREIGN PATENT DOCUMENTS

| CN | 101675550 A | 3/2010 |
| JP | 2017-126540 | 7/2017 |

\* cited by examiner

*Primary Examiner* — Brian R Ohara
(74) *Attorney, Agent, or Firm* — Oblon, McClelland, Maier & Neustadt, L.L.P.

(57) ABSTRACT

A fuel cell system includes a fuel cell stack, a compressor, an air supply passage, a bypass passage, a bypass valve, an opening degree sensor, and a controller. The air supply passage guides the air discharged from the compressor to the fuel cell stack. The bypass passage branches from an intermediate point of the air supply passage to guide the air discharged from the compressor to a discharge passage without passing through the fuel cell stack. The bypass valve is provided in the bypass passage, the bypass valve being configured to open when an upstream pressure of the bypass valve exceeds a set pressure. The controller estimates a pressure of the air supply passage based on an opening degree of the bypass valve.

5 Claims, 4 Drawing Sheets

FUEL CELL SYSTEM

INCORPORATION BY REFERENCE

The disclosure of Japanese Patent Application No. 2018-014101 filed on Jan. 30, 2018 including the specification, drawings and abstract is incorporated herein by reference in its entirety.

BACKGROUND

1. Technical Field

A technique disclosed in the specification relates to a fuel cell system.

2. Description of Related Art

A fuel cell system is disclosed in Japanese Patent Application Publication No. 2017-126540. The fuel cell system includes a fuel cell stack, a compressor, an air supply passage, a pressure-regulating valve, a bypass passage, a bypass valve, a pressure sensor, and a controller. The compressor supplies air (oxygen) to the fuel cell stack. The air supply passage guides the air discharged from the compressor to the fuel cell stack. The pressure-regulating valve is provided in a discharge passage that discharges residual air from the fuel cell stack. The bypass passage branches from an intermediate point of the air supply passage to guide the air discharged from the compressor to the discharge passage without passing through the fuel cell stack. The bypass valve is provided in the bypass passage and opens when the pressure on the upstream side exceeds a set pressure. The pressure sensor is provided in the air supply passage. The controller controls one of the pressure-regulating valve and the compressor such that a measurement value of the pressure sensor coincides with a target air pressure.

SUMMARY

The technique disclosed in the specification provides a technique of utilizing a bypass valve as a sensor that estimates the pressure of an air supply passage.

The fuel cell system disclosed in the specification includes a fuel cell stack, a compressor, an air supply passage, a discharge passages, a bypass passage, a bypass valve, an opening degree sensor, and a controller. The compressor supplies air to the fuel cell stack. The air supply passage guides the air discharged from the compressor to the fuel cell stack. Residual air discharged from the fuel cell stack flows through the discharge passage. The bypass passage branches from an intermediate point of the air supply passage to guide the air discharged from the compressor to the discharge passage without passing through the fuel cell stack. The bypass valve is provided in the bypass passage, the bypass valve being configured to open when the pressure on the upstream side of the bypass valve exceeds a set pressure. The opening degree sensor measures an opening degree of the bypass valve. The controller is configured to estimate the pressure of the air supply passage based on the opening degree of the bypass valve.

The fuel cell system may include a pressure-regulating valve provided in the discharge passage. The estimated pressure may be used for pressure regulation of the air supply passage, or may be used for detecting abnormality of a pressure sensor separately provided. In the former case, the controller may control at least one of the compressor and the pressure-regulating valve based on the estimated pressure. The controller may control at least one of the compressor and the pressure-regulating valve so as to coincide the estimated pressure with a target air pressure. In the latter case, the controller may output a signal that notifies abnormality when a difference between a pressure measured by the pressure sensor provided in the air supply passage and the estimated pressure exceeds a specified pressure difference threshold.

The details of the technique disclosed in the specification and further modifications thereof will be described in "Description of Embodiments" below.

BRIEF DESCRIPTION OF THE DRAWINGS

Features, advantages, and technical and industrial significance of exemplary embodiments of the disclosure will be described below with reference to the accompanying drawings, in which like numerals denote like elements and wherein.

DETAILED DESCRIPTION OF EMBODIMENTS

First Embodiment

Figure 1:
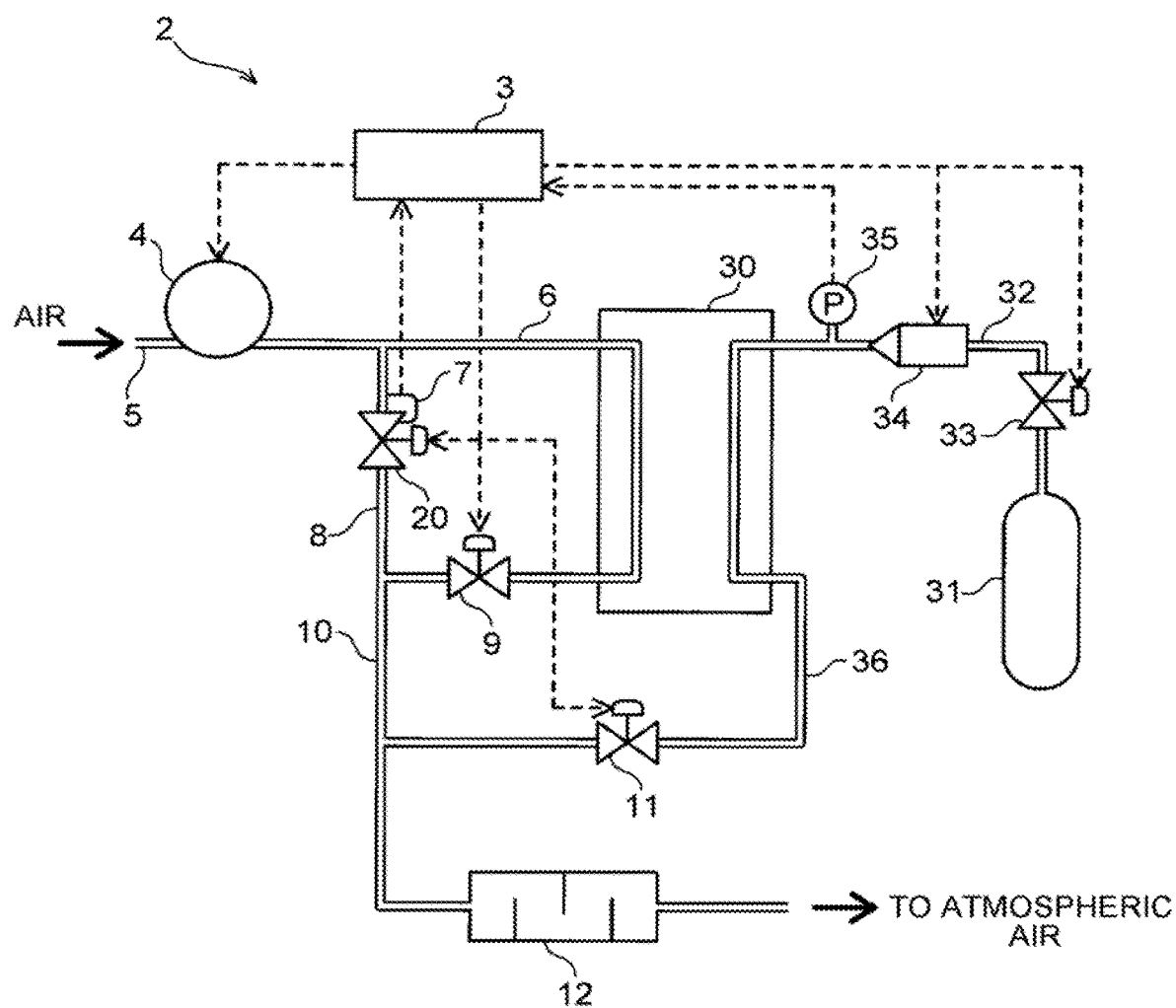
FIG. 1 is a block diagram of a fuel cell system of a first embodiment.

A fuel cell system 2 of a first embodiment will be described with reference to the drawings. FIG. 1 shows a block diagram of the fuel cell system 2. The fuel cell system 2 is a power generation system that generates electric power from an electrochemical reaction between hydrogen and oxygen in a fuel cell stack 30. A broken line in FIG. 1 expresses a signal line.

The fuel cell system 2 is mounted on a vehicle having a traveling motor. The vehicle travels by driving a motor with the electric power generated in the fuel cell system 2.

The fuel cell stack 30 of the embodiment is constituted of a large number of power generation units called cells connected in series. The fuel cell stack 30 generates electric power when hydrogen is supplied to a fuel electrode (anode) and oxygen (air) is supplied to an air electrode (cathode).

Hydrogen is sent to the fuel electrode of the fuel cell stack 30 from a hydrogen tank 31 through a hydrogen supply passage 32. The hydrogen supply passage 32 is equipped with a main stop valve 33, an injector 34, and a pressure sensor 35. The main stop valve 33 is a valve that opens or closes an inlet of the hydrogen tank 31. The injector 34 is a valve that regulates the supply amount of hydrogen gas (fuel gas) supplied to the fuel cell stack 30. Residual hydrogen gas generated as a result of reaction is discharged from the fuel cell stack 30 through a hydrogen discharge passage 36. The hydrogen discharge passage 36 merges with a later-described discharge passage 10. The hydrogen discharge passage 36 is equipped with an exhaust valve 11. The pressure sensor 35 is provided on the downstream side of the injector 34 in the hydrogen supply passage 32. The pressure measured by the pressure sensor 35 is the pressure on the downstream side of the injector 34, i.e., the pressure of hydrogen supplied to the fuel electrode of the fuel cell stack 30.

Oxygen included in air is used for the reaction with hydrogen gas. The air taken in from an air inlet 5 is compressed in the compressor 4, and is supplied to the air electrode of the fuel cell stack 30 through an air supply passage 6. The residual air generated as a result of the reaction with hydrogen is discharged to the atmospheric air through the discharge passage 10. At an intermediate point along the discharge passage 10, a pressure-regulating valve 9 is provided. A muffler 12 is connected to the downstream side of the discharge passage 10.

At an intermediate point along the air supply passage 6, a bypass passage 8 is connected. The bypass passage 8 branches from an intermediate point of the air supply passage 6, and connects to the discharge passage 10. The bypass passage 8 guides the air compressed by the compressor 4 to the discharge passage 10 without passing through the fuel cell stack 30. At an intermediate point along the bypass passage 8, a bypass valve 20 is provided. The bypass valve 20 is equipped with an opening degree sensor 7 that detects the opening degree of the valve.

The controller 3 controls the compressor 4, the main stop valve 33, the injector 34, the pressure-regulating valve 9, the exhaust valve 11, and the bypass valve 20. The controller 3 determines the pressure of hydrogen gas (target hydrogen pressure) based on a target output of the fuel cell stack 30. When the main switch of the fuel cell system 2 is turned on, the controller 3 opens the main stop valve 33 to start supply of hydrogen gas to the fuel cell stack 30. The controller 3 controls the injector 34 such that the pressure of the hydrogen gas supplied to the fuel cell stack 30 coincides with a determined target hydrogen pressure. The controller 3 feeds back a measurement value of the pressure sensor 35 provided downstream from the injector 34, and controls the injector 34 such that the pressure of the hydrogen gas supplied to the fuel cell stack 30 coincides with the target hydrogen pressure.

The controller 3 determines the pressure of air (target air pressure) supplied to the fuel cell stack 30 such that hydrogen gas and air are equal in pressure inside the fuel cell stack 30. This is because the fuel cell stack 30 deteriorates when there is a difference in pressure between hydrogen gas and air. The controller 3 controls at least one of the compressor 4 and the pressure-regulating valve 9 such that the air pressure (that is, the pressure of the air supply passage 6) supplied to the fuel cell stack 30 coincides with a target air pressure. The regulation of the air pressure will be described later.

The air remaining as a result of the reaction is released to the atmospheric air through the discharge passage 10 and the muffler 12. The controller 3 controls the exhaust valve 11, makes the hydrogen gas remaining as a result of the reaction flow to the discharge passage 10 at a proper ratio, mixes the hydrogen gas with residual air, and discharges the mixture through the muffler 12.

The bypass passage 8 equipped with a bypass valve 20 has two roles. One is to supply high pressure air to the muffler 12 without passing through the fuel cell stack 30 after stopping the fuel cell stack 30, and thereby discharge the moisture remaining in the muffler 12. The other is to function as a relief valve that lowers the internal pressure of the air supply passage 6 when the internal pressure becomes too high.

Furthermore, in the fuel cell system 2 of the present embodiment, the bypass valve 20 is used also as a pressure sensor. The upstream of the bypass valve 20 is connected with the air supply passage 6, and the pressure on the upstream side of the bypass valve 20 is equal to the pressure of the air supply passage 6. In the fuel cell system 2, the pressure of the air supply passage 6 is estimated based on the opening degree of the bypass valve 20, and the estimated pressure is used for pressure regulation of the air supplied to the fuel cell stack 30. The pressure of the air supply passage 6 is mainly dependent on the driving state of the compressor 4, and on the opening degree of the pressure-regulating valve 9.

Figure 2:
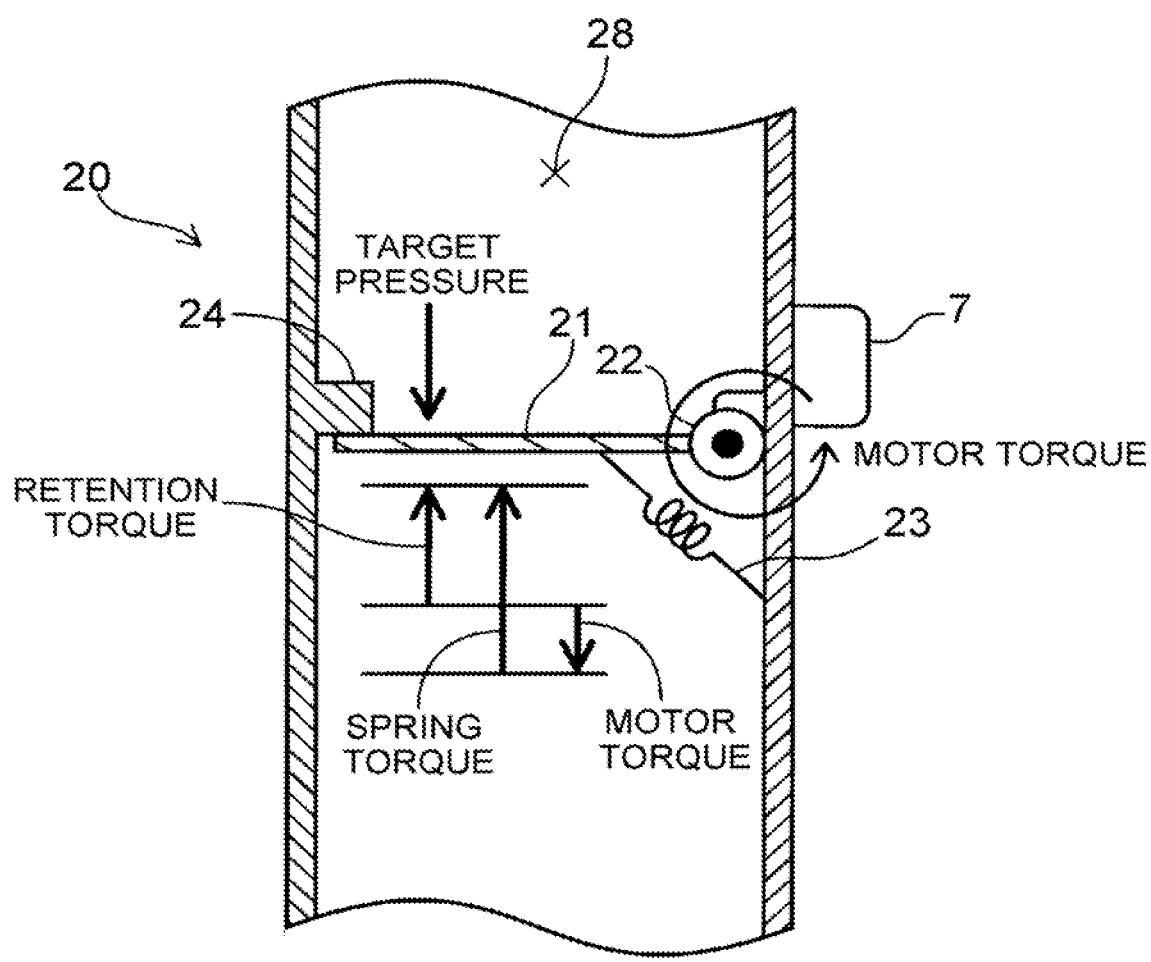
FIG. 2 is a schematic structural drawing showing one example of a bypass valve.

FIG. 2 shows the schematic structure of one example of the bypass valve 20. The bypass valve 20 includes a valve 21 that opens when the pressure on the side of upstream 28 (upper pressure) exceeds a set pressure. The valve 21 has a rotary shaft equipped with a motor 22. The valve 21 is also equipped with a spring 23. The spring 23 biases the valve 21 toward a stopper 24. When the valve 21 is pressed against the stopper 24, the valve 21 is in a closed state. The motor 22 applies to the valve 21 a torque in a valve opening direction. The torque (motor torque) applied to the valve 21 by the motor 22 is subtracted from the torque applied to the valve 21 by the spring 23 (spring torque) to obtain a torque that is equivalent to a retention torque to retain the valve 21 in the closed state. When the upstream pressure exceeds the retention torque, the valve 21 opens. That is, the retention torque is equivalent to the set pressure of the bypass valve 20. The set pressure of the bypass valve 20 can be changed by regulating the motor torque. In other words, the bypass valve 20 is a valve that is opened when the pressure on the upstream 28 side exceeds the set pressure, and the set pressure is changeable.

The bypass valve 20 is configured such that the opening degree of the valve 21 becomes larger as the upper pressure becomes larger, when the upper pressure exceeds the set pressure. The bypass valve 20 is provided with an opening degree sensor 7 that measures the opening degree of the valve 21. The opening degree measured by the opening degree sensor 7 is sent to the controller 3. The controller 3 can estimate the pressure of the air supply passage 6 from the opening degree of the bypass valve 20.

The controller 3 controls the compressor 4 based on the pressure (pressure of the air supply passage 6) estimated from the opening degree of the valve 21 in the bypass valve 20. Next, the regulation process of the air pressure executed by the controller 3 will be described.

Figure 3:
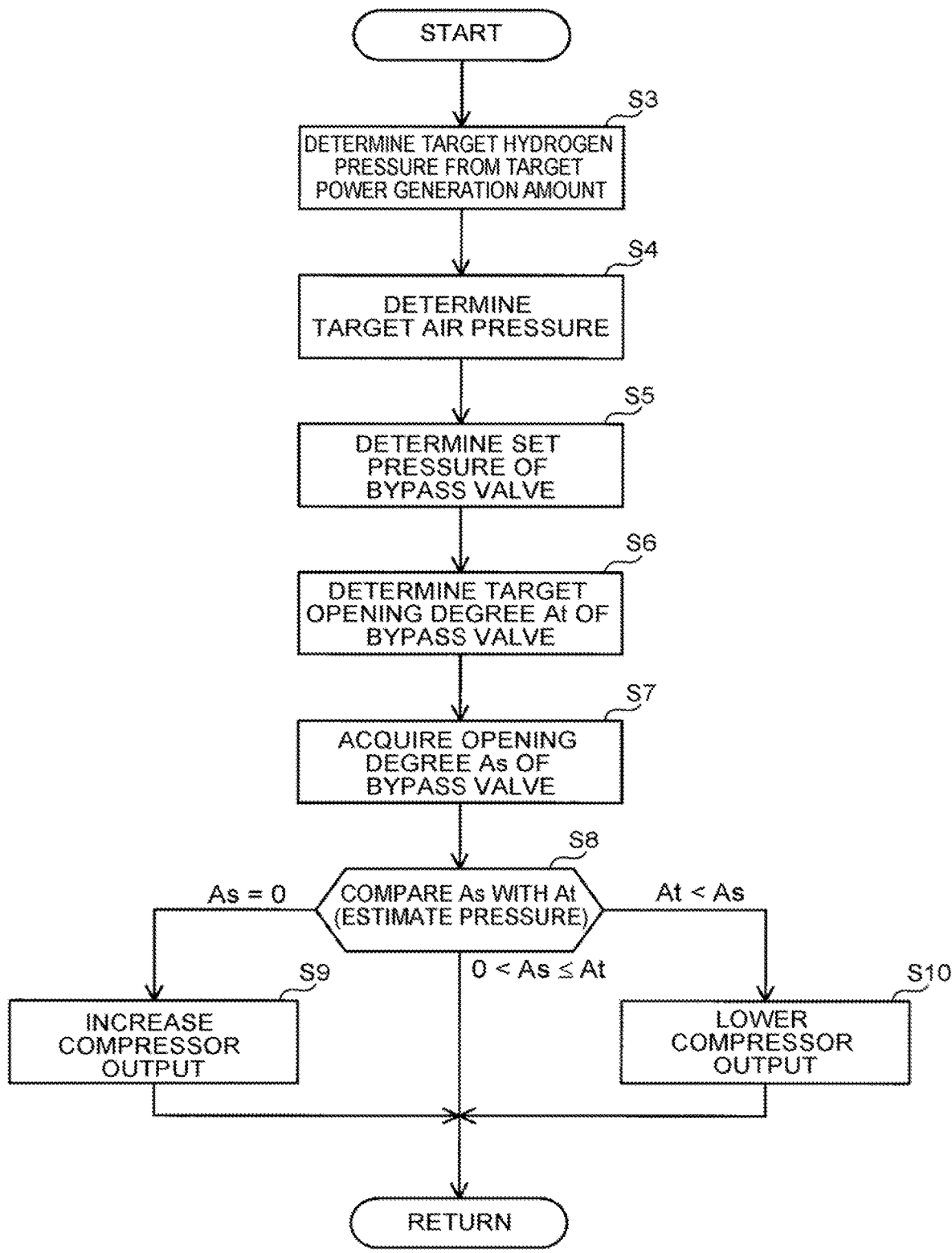
FIG. 3 is a flowchart of an air pressure adjustment process that is executed by a controller of the system of the first embodiment.

FIG. 3 shows a flowchart of the air pressure regulation process. As stated before, the controller 3 determines the pressure of hydrogen supplied to the fuel cell stack 30 (target hydrogen pressure) based on a target power generation amount (step S3). The controller 3 then determines the pressure of air to be supplied (target air pressure), such that the air pressure inside the fuel cell stack 30 becomes equal to the target hydrogen pressure (step S4). The target air pressure corresponds to a target value of the pressure of the air supply passage 6.

The controller 3 determines, as the set pressure of the bypass valve 20, a value obtained by subtracting a specified margin from the target air pressure (step S5). The controller 3 then controls the motor 22 of the bypass valve 20 such that the bypass valve 20 opens when the pressure of the bypass valve 20 exceeds the determined set pressure.

As described before, when the pressure on the upstream side (upstream pressure) of the bypass valve 20 exceeds the set pressure, the opening degree of the valve 21 changes in accordance with the size of the upstream pressure. The opening degree of the valve 21 becomes larger as the upper pressure is larger. That is, a positive correlation is formed between the opening degree of the valve 21 and the upstream pressure. In other words, the opening degree of the valve 21 is equivalent to an estimated value of the upper pressure. The controller 3 determines a target opening degree At of the valve 21 (step S6). The target opening degree At is an opening degree equivalent to the target air pressure.

The controller 3 acquires an opening degree As of the bypass valve 20 from the opening degree sensor 7 (step S7). The controller 3 then compares the acquired opening degree As with the target opening degree At (step S8). When the acquired opening degree As is zero (that is, when the bypass valve 20 is in a fully closed state), the pressure of the air supply passage 6 does not yet reach the target air pressure. Hence, the controller 3 increases the output of the compressor 4 (step S9).

The controller 3 repeatedly executes the process of FIG. 3. In the repeated process of step S8, the opening degree As acquired from the opening degree sensor 7 sometimes exceeds the target opening degree At. In that case, since the pressure of the air supply passage 6 exceeds the target air pressure, the controller 3 lowers the output of the compressor 4 (step S10). The opening degree As being larger than zero and equal to or less than the target opening degree At means that the pressure of the air supply passage 6 is substantially equal to the target air pressure. Hence, the controller 3 maintains the output of the compressor 4. While the process of FIG. 3 is repeated, the pressure of the air supply passage 6 becomes substantially equal to the target air pressure.

As stated before, the opening degree As of the bypass valve 20 has a positive correlation with the pressure on the upstream side of the bypass valve 20 (that is, the pressure of the air supply passage 6). The opening degree As being zero means that the pressure of the air supply passage 6 is lower than the pressure corresponding to the target opening degree At. The opening degree As exceeding the target opening degree At means that the pressure of the air supply passage 6 exceeds the pressure corresponding to the target opening degree At. The opening degree As being larger than zero and equal to or less than the target opening degree At means that the pressure of the air supply passage 6 is equal to or slightly lower than the pressure corresponding to the target opening degree At. That is, comparing the opening degree As acquired in step S7 with the target opening degree At is equivalent to estimating the pressure of the air supply passage 6. The fuel cell system 2 estimates the pressure of the air supply passage 6 from the opening degree of the bypass valve 20, and controls the compressor 4 based on the estimated value.

The pressure of the air supply passage 6 can also be regulated with the pressure-regulating valve 9 provided in the discharge passage 10. Hence, in the process of steps S9, S10 of FIG. 3, the pressure-regulating valve 9 may be controlled instead of the compressor 4. The controller 3 throttles the pressure-regulating valve 9, when the opening degree As is zero. The controller 3 increases the opening degree of the pressure-regulating valve 9, when the opening degree As exceeds the target opening degree At. Alternatively, the controller 3 may regulate the pressure of the air supply passage 6 with use of both the compressor 4 and the pressure-regulating valve 9.

Second Embodiment

Figure 4:
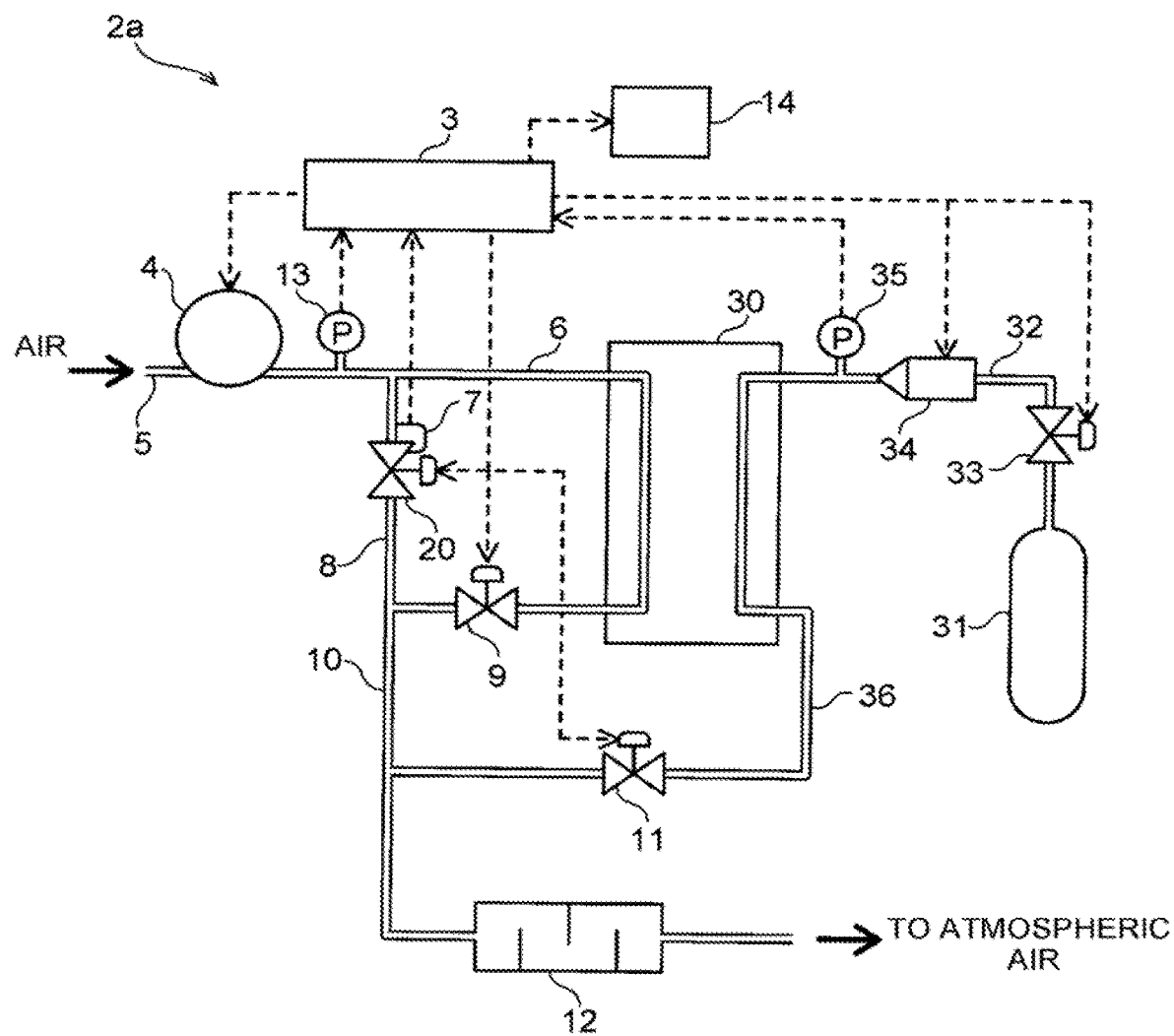
FIG. 4 is a block diagram of a fuel cell system of a second embodiment.

FIG. 4 shows a block diagram of a fuel cell system 2a of a second embodiment. The fuel cell system 2a of the second embodiment is different from the fuel cell system 2 of the first embodiment in that the air supply passage 6 is equipped with a pressure sensor 13 and that the controller 3 is connected to a display device 14. Other configurational aspects are the same as the fuel cell system 2 of the first embodiment. However, the controller 3 executes a different process.

Since the fuel cell system 2a includes the pressure sensor 13 in the air supply passage 6, pressure regulation of the air supply passage 6 is performed with use of a measurement value of the pressure sensor 13. The pressure estimated with the bypass valve 20 is used to check the pressure sensor 13. The controller 3 estimates the pressure on the upstream side of the bypass valve 20 (that is, the pressure of the air supply passage 6) from the opening degree As of the bypass valve, when the bypass valve 20 opens. The controller 3 compares the estimated pressure value with a measurement value of the pressure sensor 13. When a difference between the estimated pressure value and the measurement value exceeds a specified pressure difference threshold, the controller 3 outputs a signal that notifies abnormality of the pressure sensor 13 to the display device 14. Upon reception of the signal, the display device 14 displays a message informing occurrence of abnormality in the pressure sensor 13. The term "difference between the estimated pressure value and the measurement value" refers to "an absolute value of the difference between the estimated pressure value and the measurement value."

The fuel cell system 2a of the second embodiment can detect abnormality of the pressure sensor 13 by using the bypass valve 20.

The points of attention regarding the technique described in the embodiments will be described. The bypass valve 20 opens when the pressure over a set value is applied to the bypass valve 20. The bypass valve 20 opens more as the upstream pressure is higher. That is, the opening degree of the bypass valve 20 has a positive correlation with the upstream pressure. The fuel cell system 2 (2a) estimates the pressure of the air supply passage 6 with use of the correlation.

The structure shown in FIG. 2 is one example of the bypass valve 20. The structure of the bypass valve 20 is not limited to the structure of FIG. 2. The bypass valve 20 may have any structure as long as the structure provides a positive correlation between the pressure on the upstream side and the opening degree, when the pressure exceeds the set value.

While specific examples of the present disclosure have been described in detail in the foregoing, these examples are merely illustrative and are not intended to restrict the disclosure. The technique described in the claims includes various modifications and variations of the specific examples illustrated above. The technological components described in the specification or in the drawings demonstrate technical usefulness independently or in various kinds of combinations, and are not limited to the combinations disclosed in the claims at the time of filing the application. Furthermore, the techniques disclosed in the specification or drawings can achieve a plurality of objects simultaneously, and have technical utility by achieving any one of the objects.

What is claimed is:

1. A fuel cell system, comprising:
   a fuel cell stack;
   a compressor that supplies air to the fuel cell stack;
   an air supply passage that guides the air discharged from
      the compressor to the fuel cell stack;

a discharge passage where residual air discharged from the fuel cell stack flows;

a bypass passage that branches from an intermediate point of the air supply passage to guide the air discharged from the compressor to the discharge passage without passing through the fuel cell stack;

a bypass valve provided in the bypass passage, the bypass valve being configured to open when a pressure on an upstream side of the bypass valve exceeds a set pressure;

an opening degree sensor that measures an opening degree of the bypass valve; and a controller configured to estimate a pressure in the air supply passage based on the opening degree of the bypass valve, wherein the controller is configured to perform at least one of:

control of at least one of the compressor and a pressure regulating valve in order to increase the pressure on the upstream side of the bypass valve until the opening degree of the bypass valve becomes equal to or more than a target opening degree when the opening degree of the bypass valve is equal to or less than a target opening degree, and control of at least one of the compressor and the pressure regulating valve in order to decrease the pressure on the upstream side of the bypass valve until the opening degree becomes equal to or less than the target opening degree when the opening degree of the bypass valve exceeds the target opening degree.

2. The fuel cell system according to claim 1, further comprising a pressure-regulating valve provided in the discharge passage, wherein the controller is configured to control the pressure-regulating valve based on the estimated pressure.

3. The fuel cell system according to claim 1, wherein
the controller is configured to control the compressor based on the estimated pressure.

4. The fuel cell system according to claim 1, further comprising a pressure sensor that measures the pressure in the air supply passage, wherein the controller is configured to output a signal that notifies abnormality when a difference between the estimated pressure and the measured pressure exceeds a specified pressure difference threshold.

5. The fuel cell system according to claim 1, wherein
the controller is configured to determine, as a set pressure of the bypass valve, a value obtained by subtracting a specified margin from a target air pressure.

* * * * *